United States Patent
Zheng et al.

(10) Patent No.: US 6,554,095 B2
(45) Date of Patent: Apr. 29, 2003

(54) TORQUE-BASED STEERING SYSTEM FOR STEER BY WIRE VEHICLES

(75) Inventors: Bing Zheng, Dublin, OH (US); Gregory James Stout, Ann Arbor, MI (US); Maged Radamis, Canton, MI (US); Yixin Yao, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 35 days.

(21) Appl. No.: 09/827,680

(22) Filed: Apr. 6, 2001

(65) Prior Publication Data

US 2002/0144855 A1 Oct. 10, 2002

(51) Int. Cl.⁷ .................................................. B62D 5/00
(52) U.S. Cl. ......................................... 180/402; 701/43
(58) Field of Search ................................. 180/402, 443, 180/446; 701/41, 43

(56) References Cited

U.S. PATENT DOCUMENTS

| | | | |
|---|---|---|---|
| 4,771,846 A | | 9/1988 | Venable et al. |
| 5,097,917 A | | 3/1992 | Serizawa et al. |
| 6,079,513 A | * | 6/2000 | Nishizaki et al. ........... 180/402 |
| 6,082,482 A | * | 7/2000 | Kato et al. ................... 180/402 |
| 6,138,788 A | * | 10/2000 | Bohner et al. .............. 180/402 |
| 6,213,248 B1 | * | 4/2001 | Kawaguchi et al. ........ 180/402 |
| 6,227,327 B1 | * | 5/2001 | Nigrin et al. ............... 180/402 |
| 6,283,243 B1 | * | 9/2001 | Bohner et al. .............. 180/402 |
| 6,363,305 B1 | * | 3/2002 | Kaufmann et al. ......... 180/402 |

* cited by examiner

Primary Examiner—Daniel G. DePumpo
(74) Attorney, Agent, or Firm—John Kajander

(57) ABSTRACT

A torque-based method to steer a vehicle equipped with a steer by wire system begins when a driver applies torque to a steering wheel so as to change the direction in which the vehicle travels. Two sensors, a steering wheel angle sensor and a steering wheel torque sensor then generate an angle signal and a torque signal, respectively. In the unlikely event the vehicle steering system is malfunctioning, the steering wheel torque sensor will still generate a torque signal. This torque signal is used in place of the angle signal to generate the reference signal. Once the reference signal is generated, then it can be used to generate the road wheel angle signal, which is in turn used to position the road wheels accordingly.

22 Claims, 2 Drawing Sheets

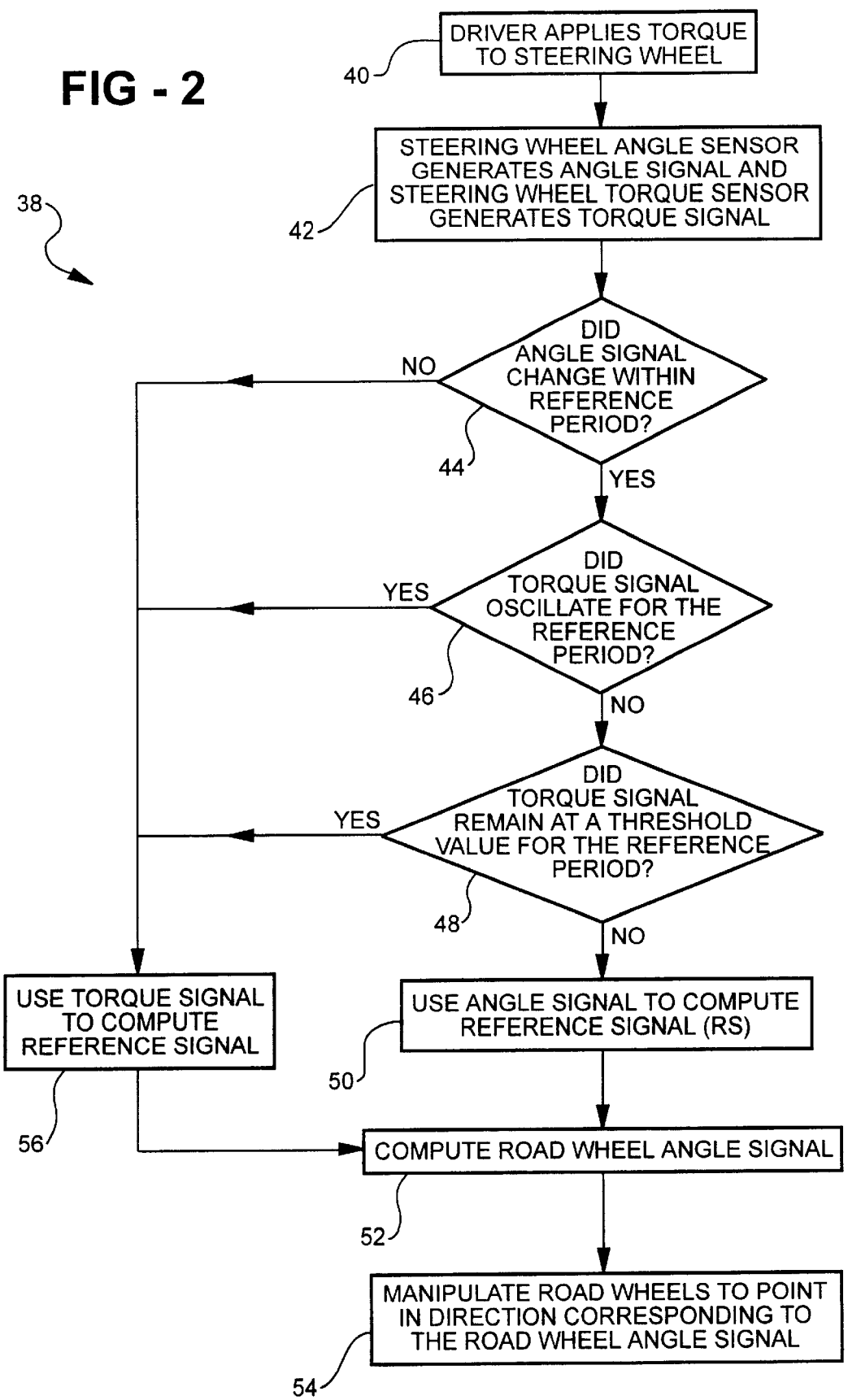

TORQUE-BASED STEERING SYSTEM FOR STEER BY WIRE VEHICLES

TECHNICAL FIELD

The present invention relates generally to steering systems, and more particularly, to torque-based steering control for steer-by-wire vehicles.

BACKGROUND ART

Steer-by-wire (SBW) systems altered traditional automotive steering systems by eliminating two mechanical connections. In traditional steering systems, the steering column is mechanically attached to a steering shaft. Similarly, the steering shaft is mechanically attached to a rack and pinion. SBW systems eliminate these two mechanical connections and replace them with electrical connections. In addition, electronic components and systems are added to the steering column and the rack and pinion to allow the system to function and to enable communication between steering components.

Currently, in the event of a steering system failure, such as when a mechanical blockage prevents the steering wheel from turning, the driver does not have any means of directing the vehicle. The loss of vehicle control can lead to undesirable consequences. Because only one method for steering control currently exists on known SBW systems, an alternate method is needed which provides the driver with adequate vehicular control in the event of a steering system failure. The present invention is directed to meeting this end.

SUMMARY OF THE INVENTION

One object of the invention is to provide a reliable means to steer a vehicle equipped with a steer-by-wire (SBW) system in the event of a steering system malfunction. Another object of the invention is to provide an alternative method to change the direction of travel of any vehicle.

In one aspect of the invention, a torque-based method to steer a vehicle equipped with a SBW system begins when a driver applies torque to a steering wheel so as to change the direction in which the vehicle travels. Two sensors, a steering wheel angle sensor and a steering wheel torque sensor then generate an angle signal and a torque signal, respectively. When the vehicle steering system is operating normally, the angle signal is used to generate a reference signal. The reference signal is then modified and used to move the road wheels to a position corresponding to the signal.

However, in the unlikely event that the vehicle steering system malfunctions, the steering wheel could become locked. In this case, an angle signal cannot be generated because the steering wheel angle measures the difference in position of the steering wheel itself. However, if the driver continues to apply torque to the steering wheel, the steering wheel torque sensor will still generate a torque signal. This torque signal then is used in place of the angle signal to generate the reference signal. Once the reference signal is generated, then it can be used to generate the road wheel angle signal, which is in turn used to position the road wheels accordingly.

The present invention thus achieves an alternative method to steer vehicles equipped with SBW systems. The present invention is advantageous because it provides a reliable method to steer a vehicle in the event of a steering system malfunction.

Additional advantages and features of the present invention will become apparent from the description that follows and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which:

FIG. 2 is a flowchart of the method for a torque-based steering system to manipulate a direction of the vehicle in accordance with one embodiment of the present invention.

BEST MODE(S) FOR CARRYING OUT THE INVENTION

Figure 1:
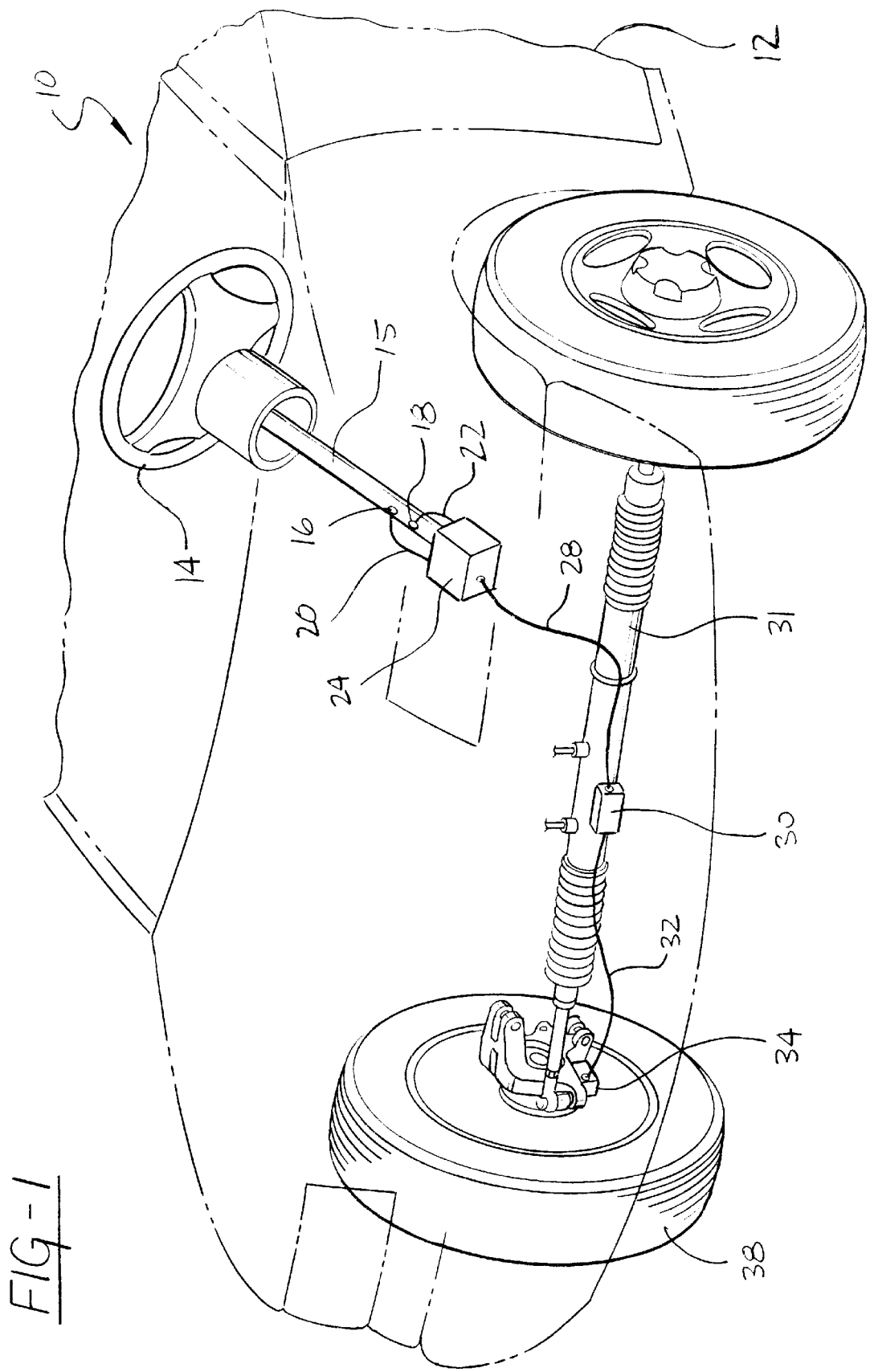
FIG. 1 illustrates a vehicle incorporating a torque-based steering system in accordance with one embodiment of the present invention.

In the following figures, the same reference numbers identify identical components in the various views. The present invention illustrates a torque-based steering system particularly suited for the automotive environment. However, the present invention also applies to various other uses that may require a torque-based steering system.

Referring to FIG. 1, an illustration of a vehicle 12 incorporating a torque-based steering system 10 in accordance with one embodiment of the present invention is shown. When the driver turns the steering wheel 14, the torque sensor 16, which is mounted on the steering shaft 15, measures the amount of torque the driver applies. Further, when the driver turns the steering wheel 14, the difference in angle between the starting position of the steering wheel 14 and its new position is measured by the angle sensor 18, which is also mounted on the steering shaft 15. One skilled in the art would realize that a steering wheel 14 is merely one type of many guidance mechanisms available. Other such guidance mechanisms include a joystick for guiding aircraft and a helm for steering a ship.

The torque sensor 16 generates a torque sensor signal (TS) 20. Similarly, the steering wheel angle sensor generates an angle sensor signal (AS) 22. The backup signal generator 24 receives both signals and determines which is used to create the reference signal (RS) 28. The steering controller 30, which is mounted on the rack and pinion 31, then receives the RS signal and generates the road wheel angle signal 32. Finally, the road wheel actuator 34 receives the road wheel angle signal 32 and directs the road wheels 36 to point in the appropriate direction.

Under normal operating conditions, the steering wheel 14 will turn freely when the driver applies torque. In this case, the backup signal generator 24 will use the AS signal 22 to compute the RS signal 28. However, in the event of a steering system malfunction, the steering wheel 14 may lock. If the steering wheel 14 is locked, there is no change in the steering wheel's 14 position. Thus, because there is no position change, the AS signal 22 cannot be generated. However, if the driver continues to try to steer the vehicle 12 even though the steering wheel 14 is locked, the torque sensor 16 can still measure the torque the driver applies to the steering wheel 14. In this instance, the backup signal generator 24 will use the TS signal 20 to compute the RS signal 28. Once the RS signal 28 is computed, the steering controller 30 generates the road wheel angle signal 34 in the usual manner.

Referring to FIG. 2, a flowchart for a torque-based steering system algorithm 38 according to one embodiment of the present invention is shown. In the present invention, the steering system algorithm 38 begins with step 40 where the driver applies torque to a steering wheel 14. The sequence then proceeds to step 42. In step 42, the steering wheel torque sensor 16 and the steering wheel angle sensor 18 generate a torque signal 20 and an angle signal 22 respectively. If the angle signal 22 is received by the backup signal generator 24, the content of the angle signal 22 is analyzed next in step 44.

In step 44, if the value of the angle signal 22 changes within a programmable reference period, the sequence then proceeds to step 46. In step 46, the torque signal 20 is analyzed for oscillations of a programmable magnitude and programmable duration. If no such oscillations are discovered, the sequence then proceeds to step 48, where the torque signal 20 is analyzed again. Here, the magnitude of the torque signal 20 is compared to a programmable threshold value. If the magnitude does not exceed this threshold value for a programmable period of time, the sequence proceeds to step 50.

In step 50, the angle signal 22 is used to compute the reference signal 28. In this case, the vehicle steering system is operating normally without any malfunctions. The sequence then proceeds to step 52 where the reference signal 28 is used to compute the road wheel angle signal 32, which, as indicated in step 54, is then used to manipulate the road wheels 36 to point in the direction indicated by the road wheel angle signal 32.

In the present embodiment, there are four circumstances under which torque signal 20 is used instead of the angle signal 22 to compute the reference signal 28. However, one skilled in the art would realize that there are numerous other circumstances in which the torque signal 20 can be used to compute the reference signal 28.

In step 44, it the backup signal generator 24 did not receive the angle signal 22 within a programmable time period, as when the angle sensor is no longer physically connected by a wire to the backup signal generator 24, then the sequence proceeds to step 56. In step 56, the torque signal 20 is used in lieu of the angle signal 22 to compute the reference signal 28 because the output of the angle sensor 18 cannot be transmitted to the backup signal generator 24 if the connection between the sensor 15 and the generator 24 does not exist. The sequence then proceeds to step 52 where the reference signal 28, which was computed from the torque signal, is then used to compute the road wheel angle signal 32. In step 54, this road wheel angle signal 32 is then used to manipulate road wheel 36 direction.

Another way in which the torque signal 20 can be used in lieu of the angle signal 22 to compute the reference signal 28 is addressed in step 44. In step 44, if the angle signal 22 did not change within a programmable reference time period, as in the case where the steering wheel 14 is locked, then the sequence again proceeds to step 56, where the backup signal generator 24 utilizes the torque signal 20 to make its computation.

An alternative way in which the reference signal 28 is generated from the torque signal 20 occurs in step 46. In step 46, if the torque signal 20 oscillates for a programmable reference period, the sequence will proceed again to step 56, where the torque signal 20 is used to compute the reference signal 28.

The fourth way in which the reference signal 28 can be generated from the torque signal 20 is demonstrated in step 48. In step 48, if the torque signal 20 remains at a programmable threshold value for a programmable reference time period, then the sequence again proceeds to step 56, where the reference signal 28 is computed from the torque signal 20. As above, the sequence then proceeds to step 52 to compute the road wheel angle signal 28. Once the road wheel angle signal 28 is computed, the sequence then proceeds on to step 54 where the road wheel angle signal 28 is used to position the road wheels 36.

From the foregoing, a new and improved method to steer a vehicle is brought to the art. The preferred embodiment's preceding description merely illustrates one of the many specific applications of the principles utilized in the present invention. Clearly, numerous and other arrangements can be evident to those skilled in the art without departing from the scope of the invention as defined by the following claims.

What is claimed is:

1. A steering system comprising:
    a steering wheel used to control vehicle direction;
    a torque sensor generating a torque signal wherein said torque signal is proportional to an amount of torque a driver applies to said steering wheel and wherein said torque sensor is mounted on said steering shaft;
    an angle sensor generating an angle signal wherein said angle signal is proportional to a change in position of said steering wheel and wherein said angle sensor is mounted on said steering shaft; and
    an electronic unit to generate a reference signal to control vehicle direction wherein during a malfunction, said reference signal is generated utilizing said torque sensor signal without the angle sensor signal and, during normal operation said reference signal is generated utilizing said angle sensor signal without the torque sensor signal.

2. The device as recited in claim 1 wherein said electronic unit utilizes said torque signal to compute said reference signal when said electronic unit does not receive said angle signal within a programmable time period.

3. The device as recited in claim 1 wherein said electronic unit utilizes said torque signal to compute said reference signal when said angle signal remains constant for a programmable time period while said torque signal changes within said programmable time period.

4. The device as recited in claim 1 wherein said electronic unit utilizes said torque signal to compute said reference signal when said torque signal oscillates for a programmable time period.

5. The device as recited in claim 1 wherein said electronic unit utilizes said torque signal to compute said reference signal when said torque signal remains at a programmable reference value for a programmable time period.

6. The device as recited in claim 1 wherein said electronic unit is a backup signal generator that computes said reference angle signal when said backup signal generator receives said torque signal and said angle signal.

7. The device as recited in claim 6 wherein a second electronic unit receives said reference signal and uses said reference signal to compute said road wheel angle signal.

8. The device as recited in claim 7 wherein said second electronic unit is a steering controller.

9. The device as recited in claim 1 wherein said road wheel angle signal is input into a third electronic unit.

10. The device as recited in claim 9 wherein said third electronic unit is a road wheel actuator.

11. The device as recited in claim 9 wherein said third electronic unit mechanically aligns road wheel position to correspond with said road wheel angle signal.

12. An automotive backup steering system comprising:
a vehicle having a steer by wire system;
a steering wheel used to control vehicle direction;
a steering shaft used to conned said steering wheel to a rack and pinion;
a torque sensor generating a torque signal wherein said torque signal is proportional to an amount of torque a driver applies to said steering wheel and wherein said torque sensor is mounted on said steering shaft;
an angle sensor generating an angle signal wherein said angle signal is proportional to a change in position of said steering wheel and wherein said angle sensor is mounted on said steering shaft; and
an electronic unit to generate a reference signal to control vehicle direction wherein during a malfunction, said reference signal is generated utilizing said torque sensor signal without the angle sensor signal and, during normal operation said reference signal is generated utilizing said angle sensor signal without the torque sensor signal.

13. The system as recited in claim 12 wherein said electronic unit utilizes said torque signal to compute said reference signal when said electronic unit does not receive said angle signal within a programmable time period.

14. The system as recited in claim 12 wherein said electronic unit utilizes said torque signal to compute said reference signal when said angle signal remains constant for a programmable time period while said torque signal changes within said programmable time period.

15. The system as recited in claim 12 wherein said electronic unit utilizes said torque signal to compute said reference signal when said torque signal oscillates for a programmable time period.

16. The system as recited in claim 12 wherein said electronic unit utilizes said torque signal to compute said reference signal when said torque signal remains at a programmable reference value for a programmable time period.

17. The system as recited in claim 12 wherein said electronic unit is a backup signal generator that computes said reference angle signal when said backup signal generator receives said torque signal and said angle signal.

18. The system as recited in claim 17 wherein a second electronic unit receives said reference signal and uses said reference signal to compute said road wheel angle signal.

19. The system as recited in claim 18 wherein said second electronic unit is a steering controller.

20. The system as recited in claim 12 wherein said road wheel angle signal is input into a third electronic unit.

21. The system as recited in claim 20 wherein said third electronic unit is a road wheel actuator.

22. The system as recited in claim 20 wherein said third electronic unit mechanically aligns road wheel position to correspond with said road wheel angle signal.

* * * * *